No. 11,886. Reissued Jan. 22, 1901.

A. A. STROM.

RAILWAY SWITCH.

(Application filed Aug. 9, 1900.)

2 Sheets—Sheet 1.

Witnesses:
John Enders Jr.
Geo. C. Darrin

Inventor:
Axel A. Strom
By Dyrenforth, Dyrenforth & Lee,
Att'ys.

No. 11,886. Reissued Jan. 22, 1901.

A. A. STROM.

RAILWAY SWITCH.

(Application filed Aug. 9, 1900.)

2 Sheets—Sheet 2.

Witnesses:

John Enders, Jr.

Geo. C. Davison

Inventor:

Axel A. Strom,

By Dyrenforth, Dyrenforth & Lee,

Att'ys.

UNITED STATES PATENT OFFICE.

AXEL A. STROM, OF AUSTIN, ILLINOIS, ASSIGNOR TO THE STROM MANUFACTURING COMPANY, OF CHICAGO, ILLINOIS.

RAILWAY-SWITCH.

SPECIFICATION forming part of Reissued Letters Patent No. 11,886, dated January 22, 1901.

Original No. 625,961, dated May 30, 1899. Application for reissue filed August 9, 1900. Serial No. 26,442.

*To all whom it may concern:*

Be it known that I, AXEL A. STROM, a citizen of the United States, residing at Austin, in the county of Cook and State of Illinois, have invented a new and useful Improvement in Railway-Switches, of which the following is a specification.

My invention relates particularly to an improvement in the connecting means between switch-rails.

The point of a split-switch rail is formed by planing off a full-sized rail, thereby removing the hard scale thereon from the surface of the point-rail which bears against the side of the main rail and subjecting the point to material wear under the continued vibratory rubbing against the main rail to which it is subjected by car-wheels passing over it.

The primary object of my improvement is to provide novel means for readily adjusting the switch-rails to take up the wear referred to as occasion requires; and my further object is to enable this wear to be taken up without requiring to that end resetting of the tie-bar so far ahead or behind the line upon which it is originally adjusted as to bring it into undesirably close proximity to a tie at either side of that line.

Figure 1:
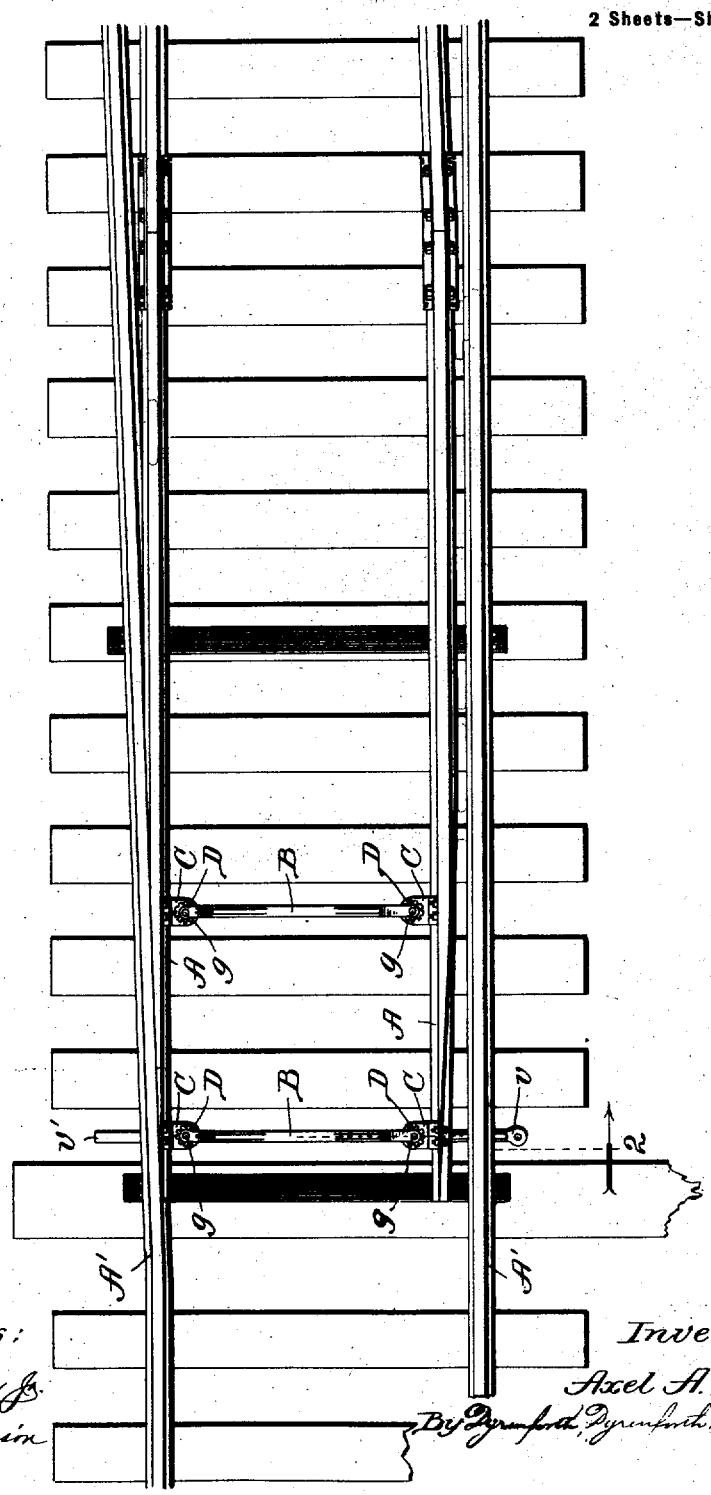
Figure 2:
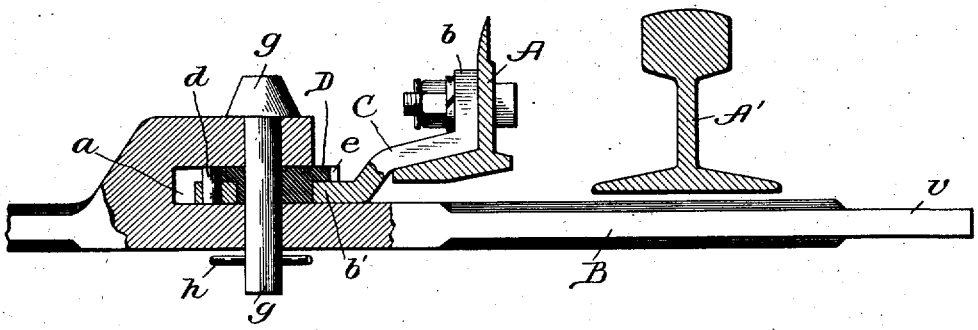
Figure 3:
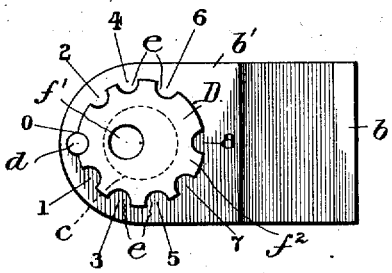
Figure 5:
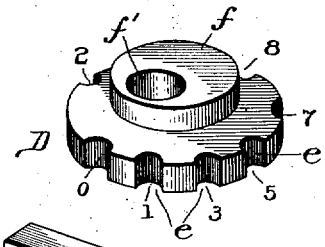
Figure 4:
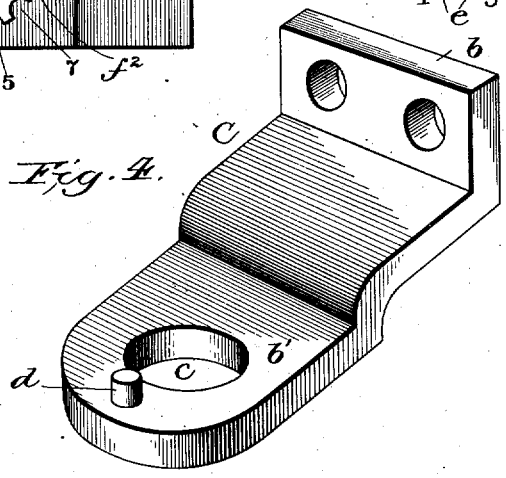

Referring to the accompanying drawings, Figure 1 is a plan view of a section of a railroad-track containing a split switch equipped with my improvement; Fig. 2, a section taken at the line 2 on Fig. 1 viewed in the direction of the arrow and enlarged; Fig. 3, a plan view of the clip detail containing the adjustable eccentric for connecting the tie-bar with the clip and through the medium of the clip with a switch-rail; Fig. 4, a perspective view of the clip provided with the opening in its tailpiece to receive the rotary eccentric and with a stop for locking the eccentric in adjusted position, and Fig. 5 a bottom perspective view of the eccentric.

A A are the connected rails of a split switch in position relative to the track-rails A′ A′. The switch-rails are connected by one or more tie-bars B, terminating at their opposite ends in sockets *a a* to embrace clips C, rigidly fastened through their head portions *b b* to the inner sides of the switch-rails at opposite ends. Each clip contains in its tail portion *b′* a circular opening *c*, adjacent to which is provided a stop-stud *d*. This stop-stud is permanently secured to the tail portion of the clip by being immovably fixed in an opening or recess in the latter, as shown. Such construction precludes the possibility of the stud becoming loosened and displaced under the vibration of the rails. In the opening *c* is rotatably seated an eccentric D, comprising a circular body *f*, fitting the clip-opening and containing an eccentric-opening *f′*, the body *f* being encircled concentrically by a flange $f^2$, containing at intervals about its edge recesses or notches *e*, each adapted to be engaged with the stud by adjusting accordingly the eccentric, and thereby lock it in its adjusted position. The bifurcated end or socket on the end of a tie-bar embraces the tail portion of a clip, thereby embracing also and confining in its bearing the eccentric, and the tie-bar, clip, and eccentric are pivotally connected together by a pin *g* passing through them and which is shown to be fastened against withdrawal by a cotter *h*.

In Fig. 1 two tie-bars B are shown, connecting the switch-rails at different points and each provided at its opposite ends with my improvement, which, however, relates to the eccentric connection between a tie-bar and switch-rail whether applied to only one or to several of the latter and to one or both ends of a tie-bar. The forward tie-bar B (shown in Fig. 1) is shown as extended at one end, at *v′*, below the bases of the adjacent rails, for the usual purpose of holding there down the switch-rail, and as extended at its opposite end, at *v*, for coupling with the connecting-bar of a switch-stand.

Access to an eccentric D in use may readily be had by removing the respective pin *g* and disconnecting the tie-bar to permit the eccentric to be taken out of the opening *c* and reset therein, with a notch *e* engaging the locking-stud to the required adjustment in case of wear on the point-rail. The opening *f′* being eccentric to the flange $f^2$, turning the eccentric D in one direction—say toward the right—the extent of one or more notches *e* sets the opening *f′*, and accordingly the respective end of the tie-bar, that much closer to the switch-rail, which under the normal throw of the switch-stand will thus be brought, notwithstanding the wear upon it, to bear against the side of the adjacent rail A′, and this however many of the notches *e* may be turned for effecting the adjustment without setting the tie-bar unduly far beyond the line through its longitudinal center in its position of original setting.

While it would be within my invention to provide my improved eccentric-adjusting means only at one end of a tie-bar, it is preferred to provide it at each end, as shown, to maintain the transverse setting of the tie-bar. Each eccentric D is shown to be provided in its flange $f^2$ with nine notches, each adapted to compensate for a variation of one-sixteenth of an inch due to wear on a point-rail, so that the two eccentrics may be used to take up one inch of wear on both point-rails. Of course, however, the number of notches and size of the eccentrics may be provided according to desire or particular requirement.

The notches *e* in the flange $f^2$ are arranged, as represented in Fig. 3, in two series extending in contrary directions about the eccentric from a given point. The members of one of said series are denoted by the numerals 0, 1, 3, 5, and 7, and those in the other series are denoted by the numerals 2, 4, 6, and 8. The purpose of this arrangement of the stops afforded by the notches is to enable the adjusting to be effected by turning the eccentric in one direction for the minimum extent thereof, in the opposite direction for the next higher degree, back again beyond the first point for the next higher, and in the contrary direction beyond the second point for the next higher, and so on throughout the entire extent of the circle in which the adjusting may be performed. This I accomplish by arranging the locking-notches *e* as represented in Fig. 3, with the notch at O in engagement with the stop *d* for the original setting in radial line with the eccentric-center, with the notch next adjacent thereto on the right (regarded from the tail end of the clip) at 1 and the distance from said center according to the predetermined rate of adjustment, with the notch next adjacent thereto on the left at 2 approximately twice that distance away from said center, the next notch on the right at 3 a further proper distance away from the eccentric-center, the next notch on the left at 4 a still further proper distance, and so on throughout the entire extent for which adjustment is provided. By this adjustment the locking-notches are provided to alternate in the order of the predetermined degrees of adjustment and form two series extending from the point of initial setting at O in relatively contrary directions about the eccentric. The degrees of adjustment may be divided, according to desire, into unequal steps, though I prefer that they shall be equal fractions of an inch, and as the notches *e* are shown to be provided in Fig. 3 they are so relatively located in their positions for alternate engagement with the stop *d* from one series to the other that the steps or degrees of adjusting are graduated to be uniform.

While I have described the feature of my improvement relating to the arrangement in a switch-rail adjustment of the alternate series of locking-stops about the eccentric as embodied in the form illustrated of notches in the flange about the adjustable eccentric to engage with a stationary stop in the clip, it is not intended to restrict it to that particular form of embodiment; but my invention in that behalf is intended to include embodiment in any other means for the adjusting purpose involving the same principle of construction and operation, thus in whatever form the series of locking-stops may be provided and whether provided on the eccentric part of the adjustment or on the clip part thereof to engage with a stop on the other part.

What I claim as new, and desire to secure by Letters Patent, is—

1. The combination with a switch-rail and its tie-bar, of means for adjustably connecting the rail and bar comprising a clip having an opening, an eccentric rotatably seated in said opening and pivotally connected with the tie-bar, notches about the eccentric and a permanently-fixed stop on one of the said parts for engaging one of said notches to lock the eccentric in its position of adjustment within said opening.

2. The combination with a switch-rail and a tie-bar therefor provided with a jaw, of means for adjustably connecting the rail and bar comprising a clip having an opening, an eccentric rotatably seated in said opening and having pivotal connection with the tie-bar, notches about the eccentric and a permanently-fixed stop on one of the said parts for engaging one of said notches to lock the eccentric in adjusted position within said opening, the eccentric being confined in the clip-opening by being embraced by the said jaw.

3. In combination with a switch-rail and a tie-bar therefor provided with a jaw, of means for adjustably connecting the rail and bar comprising a clip having an opening and a permanently-fixed stop adjacent to said opening, an eccentric rotatably seated in said opening and provided in its periphery with notches any one of which may be brought into engagement with the stop to lock the eccentric in adjusted position, the eccentric being confined in the clip-opening by being embraced by the jaw, and a pin passed through the jaw and eccentric to afford a pivot for the latter.

4. In a switch-rail adjustment the combination with the clip part, fastened to the switch-rail, of an eccentric part pivotally connecting the clip with the tie-bar and adapted to be adjusted by turning, a series of stops arranged at intervals denoting a progression of steps for the adjusting and extending in one direction about said eccentric from a given point, a series of stops arranged at intervals denoting another progression of steps for the adjusting, alternating with those in the other series and extending in the contrary direction from said given point about said eccentric, and a stop on the other said part to engage with a stop in either of said series for locking the eccentric in its adjusted position, substantially as described.

5. In a switch-rail adjustment, the combination with the clip part fastened to the switch-rail, of an eccentric part pivotally connecting the clip with the tie-bar and adapted to be adjusted by turning, a series of stops arranged at intervals denoting a progression of steps for the adjusting and extending in one direction about said eccentric from a given point, a series of stops arranged at intervals denoting another progression of steps for the adjusting, alternating with those in the other series and extending in the contrary direction from said given point about said eccentric, the stops in both series being relatively arranged to produce through the tie-bar a substantially uniform graduation in the adjusting of the switch-rail in alternating from a stop in one series to the next stop in succession in the other series, and a stop on the other said part to engage with a stop in either of said series for locking the eccentric in its adjusted position, substantially as described.

6. In a switch-rail adjustment, the combination of the clip fastened to the switch-rail and having an opening in its tail portion, a stop on the clip adjacent to said opening, and an eccentric adjustably confined in said opening and having a flange provided, to engage with said stop for locking the eccentric in its adjusted position, with one series of notches arranged at intervals denoting a progression of steps for the adjusting and extending in one direction about said eccentric from a given point, and with another series of notches arranged at intervals denoting another progression of steps for the adjusting, alternating with those in the other series and extending in the contrary direction about said eccentric from said given point, substantially as described.

7. In a switch-rail adjustment, the combination of a clip fastened to the switch-rail and having an opening in its tail portion, a stop on the clip adjacent to said opening, and an eccentric adjustably confined in said opening and having a flange provided, to engage with said stop for locking the eccentric in its adjusted position, with one series of notches arranged at intervals denoting a progression of steps for the adjusting and extending in one direction about said eccentric from a given point, and with another series of notches arranged at intervals denoting another progression of steps for the adjusting, alternating with those in the other series and extending in the contrary direction about said eccentric from said given point, the notches in both series being relatively arranged to produce through the tie-bar a substantially uniform graduation in the adjusting of the switch-rail in alternating from a notch in one series to the next notch in succession in the other series, substantially as described.

AXEL A. STROM.

In presence of—
M. S. MACKENZIE,
A. D. BACCI.